Aug. 28, 1962   F. J. CLARKE ETAL   3,051,456
AGITATING DEVICE
Filed July 28, 1959   2 Sheets-Sheet 1
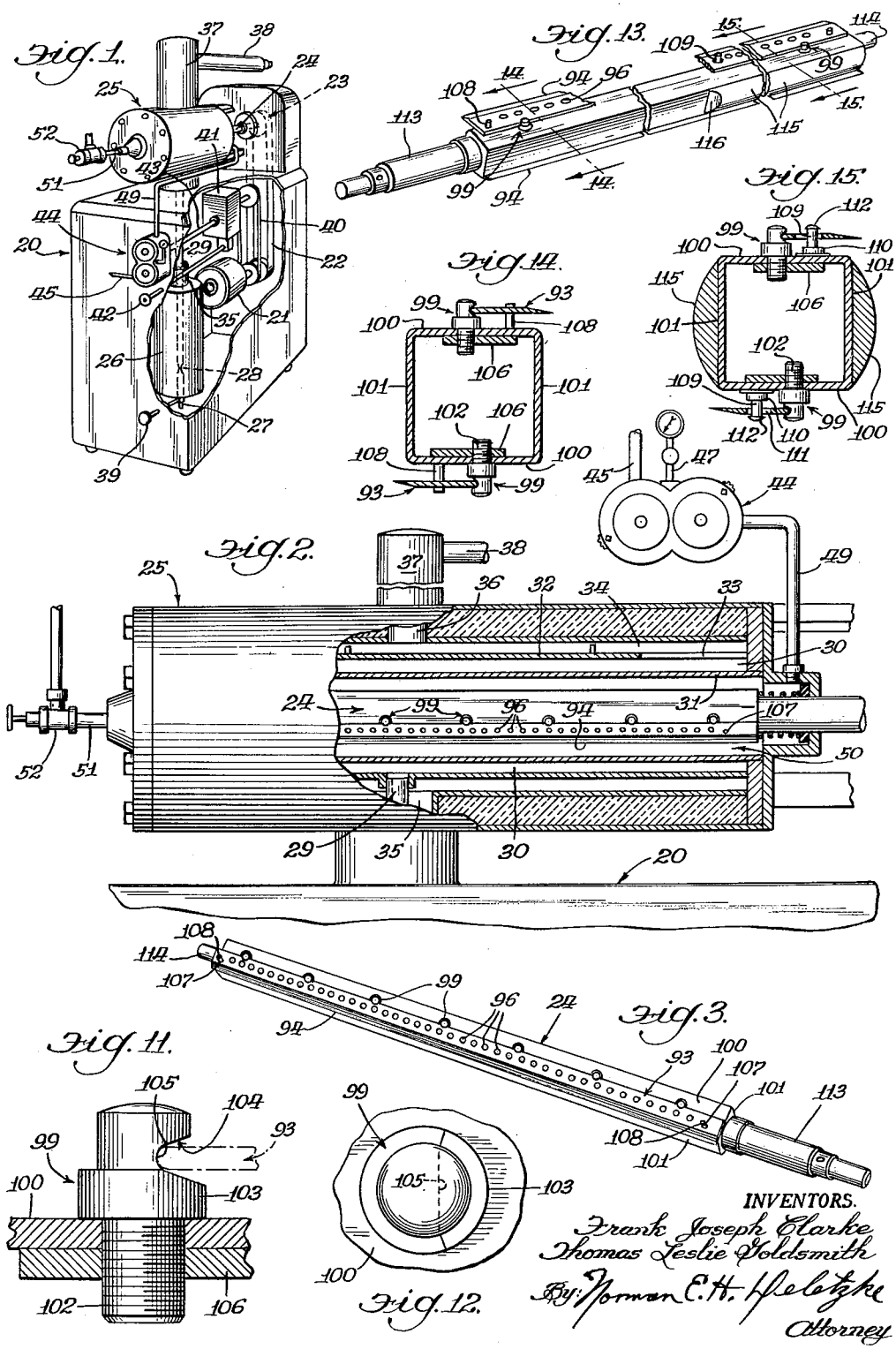

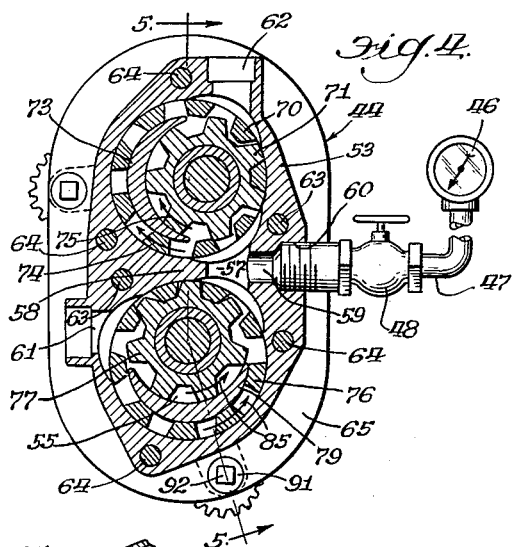

United States Patent Office 3,051,456
Patented Aug. 28, 1962

3,051,456
AGITATING DEVICE
Frank Joseph Clarke, Lynx Hill, East Horsley, and Thomas Leslie Goldsmith, Hanwell, London, England, assignors to Clarke-Built Limited, London, England, a British company
Filed July 28, 1959, Ser. No. 830,142
2 Claims. (Cl. 259—9)

This invention pertains to improvements in processing devices. More particularly stated this invention pertains to the structural improvements in a so-called continuous type of processing device wherein a product being processed, after having first been properly proportioned, is caused to flow under pressure in a relatively thin and elongated annular layer through an elongated cylindrical processing tube or cylinder while the product is simultaneously worked and blended and, if desired, attempered, so as to produce, among other things, certain desired physical characteristics within the product.

Without, however, indicating any desire of limitation, devices of the general type contemplated by this invention are frequently used in the processing of food products, such as ice cream, ices, sherberts, butter, oleomargarine, various types of so-called spreads, beverages, etc., and such devices are also used in the processing of non-food products such as tooth paste, etc.

Although the present invention may be readily adapted for use in the processing of many products, it was initially developed as an improved device for the processing or freezing of ice cream. Accordingly, for the purpose of clarity and without thus limiting the invention, the embodiment of the invention or improvements in an ice cream freezer will be hereinafter described as the preferred embodiment thereof.

This applicaton is a continuation in part of our copending applications Serial Numbers 736,230, 736,342, 736,343, now abandoned and 736,344, each filed May 19, 1958, and Serial Number 773,355 filed November 12, 1958.

In the commercial production of ice cream the great bulk of such ice cream is produced by the use of the so-called continuous type freezers. Such continuous type freezers may be grouped into two general classes, i.e. the relatively large diameter and relatively short cylinder and deep layer product flow type, and the relatively small diameter and relatively long cylinder and thin layer product flow type. In both such types of continuous freezers the ice cream mixture is pumped or forced through the refrigerated processing tube or cylinder which is provided with scraping and agitating means for scraping and agitating the product while the product is being processed. The scraping blades are carried on a dasher or agitator shaft or worker device which, in addition to supporting and driving the scraping blades, is also used for working and blending and kneading the product while the product is being processed within the processing cylinder.

In the processing of ice cream in the continuous type of freezer, wherein the temperature drop is always rapid and severe, it is important that the crystallizing product be frequently shaved or scraped from the refrigerated cylinder to prevent the development of unduly large crystals in the product with the resulting "coarseness" of product. It is also important that the product be blended without overworking the product so as to produce a desired uniformity in the product and so as to avoid the production of a "smeary" or "savy" texture or characteristic in the product. To produce the desired body and texture in the ice cream, the product must also be permitted, while it is congealing, to crystallize under relatively quiescent conditions for short periods of time intermediate repeated scraping and agitating operations. In the deep flow type of continuous freezers, such objectives are normally accomplished, at least in part, by the use of a relatively slowly rotating agitator device which is provided with beaters or workers and carries a sufficient number of scraping blades to secure the desired number of crystal shaving or scraping actions per second to thereby control the crystal growth and to permit the controlled and slower crystal development within the product while the product is momentarily and effectively removed from close contact with the freezing cylinder while the product flows through the parts of the agitator element or while the product flows through the deep flow portion of the product flow space of such a machine. In the thin flow type continuous freezers, due to the small diameter of the freezing cylinder and the relatively large diameter of the agitator shaft, beaters are not provided as is the common practice with respect to the larger diameter type of freezers. Instead, in the small diameter type freezers, an imperforate agitator shaft is normally provided carrying a reduced number of scraping blades which are rotated or driven at increased speeds to thereby secure the desired number of crystal shaving actions per second and to produce the desired turbulence in the product by the movement of the blades to thereby agitate the product while it is being processed. Due to the very rapid congealing of the product in the thin flow type of continuous freezer, it is very important that the air and ice cream mix be properly proportioned and uniformly blended before the product becomes congealed or "fixed" within the processing cylinder.

In a thin flow type of continuous freezer, the scraper blades must be forced at high speeds through a thin layer of congealing product, and of necessity a very considerable amount of power must be applied to the scraper blades during such movement. The application of such power to the scraper blades necessitates that the blades be of sufficient size and strength to withstand the resultant strains. Such necessary size and strength in the necessarily thin scraper blades, for the thin layer type freezers, can only be secured by the provision of blades having sufficient width. Increasing the thickness of such scraper blades is impractical for a thin layer type freezer, for the reason that the increased thickness of such blades would only tend to reduce the depth of the already thin layer of product within the processing cylinder. It follows of necessity therefore that in a thin layer type or small diameter type continuous freezer, the width of the scraping blades is normally such as to effectively cover or protect or shield a relatively large portion of the freezing surface of the refrigerated cylinder, immediately adjacent the outer side of the blade, thereby very appreciably reducing the heat exchange efficiency of the device. The heat exchange efficiency of the freezer is further reduced by the dulling and irregular wear of the sharpened edges of the blades, which irregularly worn or dull blades cannot effectively shave the ice crystals from the refrigerated cylinder. Such irregular wear and dulling of the blades normally results from the unsatisfactory manner in which the scraper blades are commonly supported on the agitator shaft. As a result of such unsatisfactory support arrangements, the different lengthwise extending sections of the relatively thin and long scraper blades are pivotally supported along unaligned pivot points or surfaces. The scraper blades, which are relatively wide compared to the transverse width of the refrigerated surface of the processing cylinder, also interfere with the proper blending of the portions of the product as the product is being processed.

As distinguished from the deep layer or flow type of continuous freezers, which are normally provided with product beaters and workers, the use of conventional thin layer or flow type of continuous freezers presents certain operational problems due to the fact that in the thin layer or flow type of continuous freezers the agitator device is commonly so constructed as to provide only one variety of agitation or working throughout the entire length of the agitator device. It is, however, a well known fact that different types of agitation of the product are desirable during the initial congealing and crystal growth portion of the processing as distinguished from the final processing portion, during which final processing portion of the process the latent heat of crystallization is extracted from the product to permit the completion of the processing within the single unit.

The so-called thin layer or flow freezers, wherein the product is processed while flowing in a thin layer and in very much less time than in the so-called deep layer or flow freezers, also frequently present a problem with respect to the accurate overrun control, i.e. control of the air incorporated in the finished product. Inability to accurately control the overrun in the product may mean the difference between a profitable or a non-profitable operation for the processor.

It is, therefore, an object of the present invention to provide new, novel and useful improvements in apparatus usable in the handling or processing of products, as for example, ice cream, wherein the ingredients of the product are properly and very accurately proportioned in desired adjustable quantities and well and uniformly blended prior to the introduction of the product into the processing device.

A further objective of this invention is to provide a novel and useful structure for pivotally supporting the scraping blades under controlled conditions within the processing cylinder so as to assure the uniform and controlled scraping of the product and the uniform and substantially self-sharpening type of wearing of the blades against the processing cylinder, and the desired angle of scraping of the blades against the processing cylinder.

A still further objective of this invention, is to provide an improved and easily fabricated multi-sided agitator and apertured scraping blade combination whereby to improve the product blending characteristics and to improve the heat exchange efficiency of the device by by-passing a substantial portion of the product through the apertured scraping blades and forcing the thus by-passed portions of the product by means of a product spreading action of the improved blades into engagement with the attempered cylinder in areas normally protected by conventional type scraping blades. Such improved structure uses more of the attempered area of the processing cylinder for heat exchange more of the time and more effectively blends the portions of the product and provides controlled agitation in a thin flow type continuous freezer in addition to agitation normally produced by the scraper blades. The improved structure also provides relatively quiescent flow conditions for the controlled crystallization of the product in portions of the product flow path or space which is devoid of scraper blades.

It is also a still further objective of this invention to provide an improved agitator and scraper blade combination for a freezer wherein the product, according to the improved method, is first alternately subjected to severe agitation and rapid chilling or refrigeration and controlled crystal growth followed alternately by controlled agitation or blending during relatively quiescent flow conditions while the product is being congealed and is in a subsequent portion of the process subjected to reduced agitation and blending and more rapid flow and more intense refrigeration or chilling while the latent heat of crystallization is being extracted from the product after congealing and prior to discharge of the product from the freezer, so as to complete the processing of the product and at the same time prevent excessive freezing in the processing machine.

The foregoing and other objectives, important novel operational and structural features and advantages of this invention, will become more apparent and be more easily understood upon examination of the following description thereof and the accompanying drawings and the appended claims. It should, however, be understood that, without desire of limitation, the invention will be described and illustrated as a preferred embodiment of the invention in a continuous freezer for ice cream of the thin layer flow type. Certain changes and variations may suggest themselves to those skilled in the pertinent arts, which changes may not, however, depart from the spirit of this invention and may come within the scope of the appended claims.

In the accompanying drawings:

FIGURE 1 is a general elevational view, partially in broken away section, showing the general arrangement of the improved processing device including the freezing cylinder, the product pumps, the drive for the agitator element and the product pumps, the material supply and discharge arrangements, the controls, and the refrigeration system;

FIGURE 2 is a side elevational view of the processing cylinder, partially in broken away section, showing the product supply pumps in schematic arrangement;

FIGURE 3 is a perspective view of one form of square transverse cross section agitator element and apertured scraper blade assembly;

FIGURE 4 is a sectional view taken along line 4—4 of FIGURE 5 of the drawings and illustrates particularly the close coupling of the adjacent inlet and outlet connections of the series connected product supply pumps used to proportion, blend and supply the ice cream mixture and air to the processing cylinders;

FIGURE 5 is a sectional view taken along line 5—5 of FIGURE 4 of the drawings and illustrates the arrangement whereby the capacity of the individual pumps may be separately adjusted and whereby to enable adjustment for wear of elements of the pumps and whereby to enable very accurate adjustment of the overrun of the product being produced;

FIGURE 6 is a side elevational view of one modification of an improved agitator shaft illustrating one modification of the improved arrangement of supporting scraping blades upon the agitator shaft;

FIGURE 7 is a cross sectional view taken along line 7—7 of FIGURE 6 of the drawings and illustrates the arrangement for securing the solid shaft ends into the hollow imperforate main body section of the agitator shaft. Substantially the same cross section view would apply if taken along a comparable section line at the opposite ends of the agitator shaft;

FIGURE 8 is a fragmentary cross sectional view of the agitator shaft and scraper blade combination of FIGURE 3 of the drawings positioned within a processing cylinder encased within an attempering chamber, and illustrates the relative operative transverse position of the agitator shaft and the scraper blades and the blade supports and the processing cylinder;

FIGURE 9 is a plan view of the improved apertured type of scraper blade provided with a uniformly rounded rear edge upon which the scraper blade is pivotally supported;

FIGURE 10 is a transverse sectional view taken along line 10—10 of FIGURE 9 of the drawings;

FIGURE 11 is a vertical view partially in section of the improved support element for supporting the improved scraper blade of FIGURES 9 and 10 on the agitator shaft;

FIGURE 12 is a plan view of the blade support shown in FIGURE 11 of the drawings;

FIGURE 13 is a perspective view of a modified type agitator shaft and scraper blade combination, wherein the agitator shaft is provided with multiple agitating surfaces which produce variations in transverse cross section configuration of the agitator shaft and the product flow space within the processing cylinder.

FIGURE 14 is a cross sectional view taken along line 14—14 of FIGURE 13 of the drawings and illustrates the square cross section of the end of the agitator shaft shown in FIGURE 13 adjacent the inlet end of the processing cylinder;

FIGURE 15 is a cross sectional view taken along line 15—15 of FIGURE 13 of the drawings and illustrates the cross section configuration of the end of the agitator shaft adjacent the product discharge portion of the processing cylinder.

Referring to the drawings, in which like elements are identified by like numerals, and referring particularly to FIGURES 1 and 2 of the drawings, 20 represents a housing and frame assembly encasing a power unit or motor 21 drivingly connected by power transmitter or belt or chain 22 to agitator drive 23 to which drive 23 the outer end of the horizontally disposed agitator shaft 24 of the improved freezer is releasably coupled. Agitator shaft 24 extends into and is housed within the horizontally disposed freezer cylinder assembly 25 supported on the housing 20. Accumulator 26 for heat exchange medium, such as refrigerant, is housed within the base 20. Heat exchange medium supplied through pipe 27 may be pumped from the accumulator 26 by circulator type pump 28 through pipe 29 into the elongated and annular heat exchange medium passage 30 through which the heat exchange medium is circulated continuously. Passage 30 is positioned intermediate the elongated and cylindrical processing cylinder 31 and the similarly shaped encasing tube 32. In the event volatile liquid refrigerant is used, the gaseous as well as the unspent or liquid refrigerant portions may pass through ports 33 into the annular separating channel 34 which surrounds the encasing tube 32. From channel 34 the liquid refrigerant may be returned to accumulator 26 through pipe 35 and the gaseous refrigerant withdrawn from channel 34 through pipe 36 from which it flows through unit 37, which may be a suitable refrigeration control, into and through discharge pipe 38 to a suitable discharge or processing or compressing station. The flow of the refrigerant through the device may also be controlled by control 39 associated with supply pipe 27.

Power unit 21 is also drivingly connected through a suitable power transmitter 40 to the adjustable speed reducing unit 41 which may be controlled through lever 42 to vary the speed of rotation of the power shaft 43 used to drive the variable capacity and individually adjustable ice cream mix supply and overrun control pump unit 44. The over-all capacity of pump unit 44 is variable in accordance with the speed of rotation of drive shaft 43. The individually adjustable features of the pump elements in the pump unit 44 will be later explained.

Ice cream mix is supplied to the variable capacity and adjustable pump unit 44 through ice cream mix inlet pipe 45. In pump unit 44 the ice cream mix is very accurately proportioned and blended with air or other suitable gas supplied to pump unit 44 through the gas or air meter 46 and pipe 47 under control of gas or air control valve 48. The well blended and very accurately proportioned ice cream mix and gas mixture is metered by pump unit 44 through pipe 49 into the rear portion of the freezer or processing cylinder 31, and is forced under the pressure of the pump unit 44 through the thin and elongated and substantially annular product flow space or passage 50 intermediate the imperforate agitator shaft 24 and the processing cylinder 31.

The fully processed ice cream is discharged from the front end of the cylinder 31 through pipe 51 which includes a conventional type spring loaded product pressure regulating valve 52, whereby to regulate the pressure of the product such as ice cream within the processing cylinder 31.

The ice cream mix aerating pump unit 44 is preferably provided with a housing formed of metal or other suitable material and consists of a main body section 53 and a front cover plate 54. Two cylindrical bores extend into the body section 53 from the front thereof almost to the back thereof, with the respective axes of such bores being perpendicular to the substantially flat and parallel front and back surfaces. These bores form the pump chambers 55 and 56 of the aerating apparatus 44 and are covered by the front cover plate 54.

A channel or transfer duct 57 is formed in the wall or partition 58 separating the two bores or chambers 55 and 56. The partition or wall 58 is only of a thickness comparable with that of the thinner portions of the external walls of the housing 53. Accordingly the transfer duct 57 is short in relation to its width or transverse dimensions and this promotes turbulence within the transfer duct 57. An aperture 59 in the body 53 opens into this transfer duct 57 and constitutes a gas inlet port 60. The air or other suitable type of gas supply pipe 47 is threaded into the gas inlet port 60. Gas supply pipe 47 includes a gas flow control valve 48 and a gas flow meter 46 at the outer end of pipe 47.

A mix inlet port 61 is formed in the side of the body 53 near the separating wall 58 and communicates with the first chamber 55, which houses the inlet pump assembly. The aerator unit outlet port 62, formed in the upper part of the body 53 communicates with the second chamber 56, which houses the discharge pump assembly, and also communicates with the aerated mix discharge pipe 49 which conducts the aerated mix from pump and overrun control unit 44 to the processing cylinder 31.

The cover plate 54 is clamped on to the body 53 in part by studs 63, but primarily by studs 64 which extend through to a cast bearing block 65 and also clamp this to the back of the body 53. A main shaft 66 is journaled in two ball races 67 and 68 in the casting 65 and passes through a bushing 69 into the chamber 56. A ring gear 70 is keyed on to the end of the shaft 66 and meshes with a pinion 71 rotatably mounted inside the ring gear 70 on an eccentrically disposed stub shaft 72 fixed in the cover plate 54. A wall 73 of crescent section projects from the plate 54 in the space between the ring gear 70 and the pinion 71, opposite the point of engagement between these elements.

The gear 70, the pinion 71 and the crescent wall 73 together form a gear pump for pumping and blending and proportioning and discharging the aerated mix and forcing the materials round from the transfer duct 57 to the outlet port 62. Thus the ring gear 70 is driven round in the sense shown by the arrow 74 in FIGURE 4, driving the pinion 71 in the same sense. Material, i.e. gas and mix, is entrained in small slugs, in pulse-like fashion, in the pockets formed between the wall 73 and the gears of the ring gear 70 and the pinion 71 and carried round the path indicated by the arrow 74 and the arrow 75. The pockets are relatively large on account of the coarseness of the teeth of the gear 70 and the pinion 71 and hence the flow from the pump is strongly pulsating, producing a thorough mixing or very fine blending effect upon the mix and the gas being pumped.

A similar gear pump is arranged in the cavity 55 having a ring gear 76, a pinion 77 on a stub shaft 78 and a crescent wall 79. The ring gear 76 is keyed on to a shaft 80 journaled in a ball bearing 81 in the casting 65 and passing through a bushing 82 in the body 53.

The main shaft 66 carries a small pinion 83 meshing with a large pinion 84 on the shaft 80. Accordingly the first stage or mix gear pump in the cavity 55 is driven in the opposite sense to that of the pump in the cavity 56 and at a slower speed (approximately two-sevenths of the speed of the pump in the cavity 56). Material is thus driven round from the inlet port 61 to the transfer port 67 along the paths indicated by arrows 85 in FIGURE 4, the flow therein also being uneven and pulsating. The gas inlet port 59 is connected to a gas supply source through the gas inlet valve 48 and meter 46 or communicates with the atmosphere through the valve 48 and meter 46 when air is the gas used, all in the manner previously described.

In operation, the material being aerated, proportioned and blended is pumped in the first chamber 55 and pumped out by the rotor in the second chamber 56, a partial vacuum being created in the transfer duct 57, by reason of the different speeds at which the pumps are driven. Gas is sucked in through the gas inlet port 59 and, in a transverse flow, meets the irregularly and pulsating flow of liquid or semi-liquid. In the highly turbulent flow thus created, the gas is entrained intermediate the slugs or pulses of the liqued or semi-liquid, further dispersion and blending of the mix and gas occurring in the second chamber 56 before discharge of the well blended and aerated mixture through the outlet port 62. The gas inlet valve 48 is adjusted to provide the degree of aeration or overrun control required. The degree of aeration when using atmospheric air is substantially constant for a given setting of the valve 48, being substantially independent of the rate at which the liquid or semi-liquid is pumped through the device.

Provision is made for adjusting the clearance of the ring gears 70 and 76 by motion of the shafts 66 and 80 along their axes. The mechanism for doing this will be described only with reference to the shaft 80. The thrust in the shaft 80 is towards the left as viewed in FIGURE 5, and is transmitted to the bearing 81 by means of a collar 86 on the shaft 80. The bearing 81 is mounted in a collar 87 screwed into a threaded bore 88 in the casting 65. The collar 87 has a toothed outer periphery 89 meshing with a pinion 90 on a stud 91 journaled in the casting 65. The stud 91 has an end 92 of square section and may be rotated by a suitable key applied to this end. By this means the collar 87 can be screwed into and out of the bore 88 and hence the clearance of the gear 76 determined. It will be appreciated that these means for adjusting the pump clearances are such that adjustment can be effected while the pump is running.

The described pump unit 44 produces the fine blending and the thorough intermixing of minute gas bubbles throughout the mix. The described individual adjustment features of the separate pumps in unit 44 enable satisfactory adjustment to compensate for wear of the gears and pinions and housing surfaces. The adjustment feature also enables the adjustment of the pumps for very accurate control of the overrun of the product by suitable variations in the relative capacities of the two pumps in the unit 44.

The blended and aerated and carefully proportioned mixture of air and mix is discharged under pressure of the pump unit 44 from pipe 49 into the rear portion of the refrigerated processing cylinder or tube 31 through which it is forced under pump pressure through the thin or slender and elongated and substantially annular product flow space 50. In flow space 50 the product is subjected to the attempering action of the attempered thin walled cylinder 31 while also being subjected to the controlled agitating and working and blending and kneading and scraping actions of the improved agitator shaft 24 pivotally carrying improved scraping blades 93.

Each of the elongated, flat, straight and slightly flexible blades 93, which are preferably made of metal and which are of approximately the same length as the cylinder 31, has an uninterrupted and straight front or leading or scraping edge 94 which is parallel to the uninterrupted and straight and rounded trailing or following and product spreading edge 95 thereof. Blades 93 each has a longitudinally extending row of circular by-pass apertures or ports 96 formed therein slightly adjacent the rear or follower and product spreading edge 95 thereof. Ports 96 are uniformly spaced at intervals along the length of the respective blade 93. The axis of each port 96 is arranged perpendicular to the planes of the parallel flat inner side 97 and outer side 98 of the blade. In the embodiment illustrated in FIGURES 2, 3, 6, 9 and 10, the scraper blade 93 is approximately 30.5 inches long and 1.07 inches wide and .11 inch thick and is preferably formed with forty-one holes or ports 96. The ports 96 are three-eighths of an inch in diameter and the centers of the ports 96 are spaced approximately eleven-sixteenths of an inch apart and are spaced approximately three-eighths of an inch from the rear edge 95 of blade 93. The scraping edge 94 is produced by a fifteen degree bevel along the front or leading edge of the blade. In this arrangement the sum of the diameters of the by-pass ports 96 is equal to approximately one-half of the length of the blade 93.

The improved agitator shaft 24 and scraper blade assembly referring particularly to the variant thereof shown in FIGURES 2, 3, 6, 7, 8, 11 and 12, is rotatably and coaxially mounted within the processing cylinder 31. Shaft 24 pivotally and rotatably carries two symmetrically positioned and longitudinally extending scraper blades 93 outwardly of and substantially parallel to two flat and opposed sides of the imperforate and hollow and rigid shaft 24 by means of pivot support or blade hinge block elements 99.

The cross section of the product working portion of the imperforate and hollow shaft 24, as shown in FIGURE 3, taken perpendicular to the axis of the shaft, is square, measuring approximately two and eleven-sixteenth inches on a side, which sides are approximately 30.5 inches long. Shaft 24 has two opposed and symmetrically arranged and longitudinally extending and flat blade supporting sides 100. Each side 100 is provided with a series of equally spaced blade supports 99 forming a longitudinally extending row of blade supports or hinge elements 99 for supporting the two similarly elongated and flat scraper blades 93 substantially parallel to the underlying shaft surfaces 100. The flat surfaces 100 of the shaft are substantially equal in length to the length of the blades 93 and the length of the cylinder 31.

Each of the four outer surfaces of the uniformly configured shaft 24 including the two opposed and parallel and flat blade support surfaces 100 and the remaining two opposed and parallel and flat kneading or product working surfaces 101, which are ninety degrees removed from surfaces 100, is defined along its longitudinally extending sides by straight side edges parallel to the axis of shaft 24. None of the flat outer surfaces 100 and 101 of the shaft, which sides are joined along their contiguous edges, comprises more than one-third of the surface of the agitator within the processing portion of the chamber or cylinder 31. Cylinder 31 is approximately 4.14 inches in internal diameter and approximately 30.5 inches long.

Each of the mentioned straight and longitudinally extending and parallel side edges of the flat and equal length and width surfaces 100 and 101 is spaced approximately one-fourth inch from the inner surface of the cylinder 31 and is spaced more remote radially from the axis of the shaft 24, to which it is parallel, than the longitudinally extending mid-section portion of the respective surfaces 100 or 101 defined in part by such parallel side edges. In each instance the two opposed and symmetrically arranged blade mounting surface portions 100, which portions underlie the two opposed scraper blades 93, are as far removed radially from the axis of the shaft as either of the two symmetrically arranged surfaces 101 of the shaft 24 along the axial extent thereof surrounded by the orbit of the blades 93. The sections 101 of the outer surface of the shaft are entirely devoid of blades or the action of blades, and comprise the product kneading surfaces and together with the adjacent portion of the inner surface of cylinder 31 form two opposed and circumferentially spaced product kneading sub-chambers 117. In sub-chambers 117 the product is kneaded under relatively quiescent conditions. The circumferentially extending series of alternating flat sides 100 and 101, together with the inner surface of cylinder 31, form the elongated and slender and substantially annular flow passage 50 which consists of a series of thin and longitudinally extending and circumferentially spaced sub-chambers.

The blade support 99, of which several are used and which are preferably mounted on approximately four and three-eight inch centers aligned approximately three thirty-seconds of an inch ahead of the center line of the underlying surfaces 100, as viewed in FIGURE 8, pivotally support the blades 93 on the shaft 24. Supports 99 each consist of a stud having an inner threaded end 102 threaded perpendicularly into the flat blade support surface 100. Support 99 is provided with an annular flange 103 which engages the adjacent underlying flat surface 100. Each of the blade supports 99 is provided with a V-shaped groove 104 opening at approximately a forty degree angle in the direction of rotation of shaft 24, for supportingly and pivotally receiving the rear rounded straight edge 95 of an associated blade 93. Each V-shaped groove 104 is provided at its apex with a rounded blade seat or bearing surface 105, the center of which is positioned slightly over one-fourth inch from the underlying surface 100. The bearing surface 105 is complementary to and of substantially the same radius as the rounded rear edge or bearing and blade support surface 95 which comprises the rear, straight and uninterrupted product spreading edge of blade 93. Surface 95 is pivotally seated in the longitudinally aligned surfaces 105 of the studs 99. Surfaces 105 are arranged in a straight and longitudinally extending row outwardly of surface 100.

A plane bisecting the angle of the V-shaped grooves 104 would be approximately parallel to the plane of the underlying support surface 100 of the shaft 24 and would also be approximately parallel to the two parallel flat surfaces 97 and 98 of the blade 93.

Reinforcing strips 106 are secured to the inner sides of the surfaces 100 of the thin walled and hollow agitator shaft 24 and also receive the threaded ends of the studs 99. Such structural reinforcing strips 106 also increase the heat conducting capacity of the surface 100 of the shaft 24 immediately below the scraper blades 93, and together with the thin walled construction of shaft 24 secure an arrangement wherein "freeze-on" of the product is prevented.

The angle of each of the V-shaped grooves 104 is such as to permit a reasonable amount of tilting or hinging of the blades 93. To prevent the endwise displacement of blades 93, and to prevent the easy release of those blades from supports 99, each blade 93 is provided at its opposite ends with an aperture 107 loosely fitted over an associated locking stud 108 carried by shaft 24 at the opposite ends thereof. In assembling the blades 93 on the supports 99 the ends of the blades may be slightly flexed outwardly temporarily to permit snapping each aperture 107 over the corresponding locking stud 108.

The variation of the agitator and blade assembly illustrated in FIGURES 6 and 15, include a scraper blade securing stud 109, secured to the surface 100 of agitator shaft 24 ahead of the line of pivot supports 99. Studs 109 may be secured by threading into the adjacent surface of agitator 24. Studs 109 are provided with an annular collar 110 abutting against the surface 100 of shaft 24 and underlying the blade 93. Each stud 109 extends through a special circular opening 111 in blade 93 and is provided at its outer end with a flange or head 112 which overlaps a portion of the adjacent surface of blade 93 at one side of opening 111 when blade 93 is assembled in operative position, thereby preventing the easy dislodging of blade 93 during the assembly of shaft 24 into the processing cylinder 31.

Although the main body portion of agitator shaft 24 is hollow, and is preferably formed of thin square metal tubing, it is provided with solid metal pivot or support and bearing and drive ends 113 and 114 which are inserted into the adjacent ends of the tubular portion of the shaft 24 and are suitably secured thereto, including the anchoring of some of the studs 99 and 108 as shown in FIGURE 7. Although the sectional view shown in FIGURE 7 was taken at the end of shaft 24 adjacent the drive end 113 thereof, substantially the same section would apply to the opposite end of shaft 24.

Shaft 24 extends throughout the entire length of the processing cylinder 31 and is supported in a readily removable manner at its opposite ends in conventional support arrangements not shown in detail.

As clearly illustrated in FIGURE 8, the scraping blades 93 are normally supported in operative position with the flat sides thereof substantially parallel to the underlying surfaces 100 of the shaft, with the scraping edge 94 extending circumferentially ahead of the front edge of the underlying surface 100. The blades 93, during rotation of the shaft, follow a path wherein the flat sides of the blades are substantially tangential to the orbit of rotary motion of the blades.

Due to the improved pivoted support for the blades 93, the scraping edge 94 thereof may adjust itself nicely to the complementary inner surface of cylinder 31, so as to secure uniform wear of the scraping edge 94 and a substantially self-sharpening engagement between the edge 94 and the inner surface of cylinder 31. The improved supports for blades 93 also permit the automatic adjustment of the slightly flexible and resilient blades 93 to slight variations in the inner surface of cylinder 31, whereby to maintain close and controlled scraping engagement at a constant scraping angle between the scraping edges 94 and the inner surface of the processing cylinder 31.

The modification of the agitator shaft shown in FIGURES 13, 14 and 15 comprises what may be referred to as a compound agitator shaft. The end of the modified shaft 24 next to the drive end 113 thereof, which end would be positioned at the inlet end of cylinder 31, is of a square cross section as shown in FIGURE 14, carrying scraper blades 93 and blade supports 99 and locking studs 108 in precisely the same manner as hereinbefore described with respect to the square agitator shaft shown in FIGURE 3. The portion of the modified shaft 24 which is of such square cross section extends approximately half the length of the modified shaft and occupies the inlet portion of the processing cylinder 31 wherein the product is first chilled while still in liquid state and while being congealed, during which portion of the processing cylinder the greatest amount of agitation and working of the product is required. The remaining or front half portion of the modified shaft 24 is of a cross section as shown in FIGURE 15, wherein the two sides 101 of the shaft 24 which do not carry scraper blades have been provided with outwardly rounded displacement surfaces 115 whose outer curved surfaces are parallel to and spaced approximately one-fourth inch from the inner surface of cylinder 31 when the shaft is mounted coaxially within cylinder 31 in operative position. The two opposed curved surfaces 115 have a diameter of approximately three and one-half inches. The two opposite flat surfaces 100 underlying the scraper blades 93 are of the same dimensions as the comparable surfaces on the shaft shown in FIGURE 3 and extend the entire length of the working portion of shaft 24. At the locus of juncture of the rounded displacement surfaces 115 and the flat sides 101 as shown in FIGURE 13, the displacement surfaces 115 are provided with beveled ends 116 to avoid the obstruction of the flow of material passing through the thin product flow space 50. An approximate ratio of fifteen to nineteen exists between the length of the flat surfaces 101 and the length of the rounded displacement surfaces 115 of the modified shaft 24. The portion of the modified shaft of FIGURE 13 which includes the displacement surfaces 115 is positioned at the discharge end of the cylinder 31. Substantially all of the product before reaching such position has been congealed and a reduced amount of working and agitation is desired while the latent heat of crystallization is being extracted from the product. The square end of the modified agitator provides the desired agitation, working and kneading of the product in the inlet portion of chamber 31 during the crystallization phase of the product. The rounded displacement surfaces 115 at the discharge end of the agitator insure the reduced working of the product while the latent heat of crystallization is being extracted therefrom, thereby enabling the complete processing of the product within the cylinder 31.

In the operation of the improved processing device, which has been described as an ice cream freezer, the blades 93 rotate in a circular orbit through the thin walled stream of product in the flow space 50. The rotation of shaft 24 and the blades 93 of necessity cause the product being processed to rotate within the tube 31 as it passes lengthwise therethrough. As the product travels lengthwise through the tube 31 it is repeatedly scraped from the inner surface of the tube. The product thus scraped from the tube 31 travels inwardly of the blades 93 toward the imperforate surfaces 100 of shaft 24. Portions of the thus scraped product will pass through between the shaft 24 and the blades 93 while other portions, approximately one-half of the scraped product, will pass through the by-pass ports 96 in the blades 93. Those portions of the product which are thus by-passed through ports 96 are re-exposed substantially instantaneously to the inner chilled surface of the tube 31, there to be further attempered, and are also simultaneously blended with portions of the product flowing lengthwise of the tube 31 behind the particular blade 93 through which the by-passed portions have just passed. In view of the fact that the by-pass apertures 96 are located relatively near the scraping edge 94 of the relatively narrow blade 93, comparatively little heat exchange surface of the cylinder 31 is protected by the blades 93 from substantially constant engagement with product while the shaft 24 and the blades 93 are operating. The position of the blades 93 and the rear spreading edges 95 are such with respect to the cylinder 31 that the product by-passed through the ports 96 is immediately spread by the spreading edges 95 back onto the adjacent surface of cylinder 31.

In each variant of the improved agitator shaft 24, the blade carrying surfaces 100 are separated by flat kneading surfaces 101 to thereby provide product kneading sub-chambers devoid of scraping action intermediate the oppositely positioned scraper blades 93. In each instance the scraping edge 94 of each of the blades 93 extends forwardly out beyond the flat surface 100 underlying the respective blade 93 and extends into the locus of juncture of that surface 100 and the surface 101 angularly advanced with respect to that scraper blade 93.

The product, after passing a blade 93 within cylinder 31 next flows past the rear or follower or spreading edge 95 and then flows over the side edge of the surface 100 rearwardly of the blade into the portion of the confined flow space 50. Such portion of space 50 is defined along its outer periphery by a circular segment of the inner wall of cylinder 31 and is defined along its inner periphery by one of the surfaces 101 of the shaft 24 intermediate the blades 93. Due to the fact that such outer surface section of the shaft is of varying radial spacing from the axis of the shaft, the cross section of such portion of the flow space 50 will be alternately expanded and contracted as shaft 24 rotates. Such alternate expanding and contracting cross section of flow space 50 will of necessity result in the similar alternate expanding and compressing of the product as it passes through such irregularly shaped passage, producing thereby the hereinbefore mentioned kneading of the product while the product is flowing under relatively quiescent conditions, and facilitate the blending and desired crystallization of the product. The mentioned scraping, working, blending and kneading actions are repeated many times while the product flows through the cylinder 31.

The action of the modified agitator shaft illustrated in FIGURE 13, will of course not produce the mentioned kneading effect along that portion thereof provided with the displacement surfaces 115, but will provide for even more relatively quiescent flow conditions along such displacement surfaces.

The stated dimensions have been given herein only by way of example to illustrate the relative proportions of some of the parts of a selected size of device embodying the subject invention. From the foregoing description of this invention and from the accompanying drawings, it will be apparent that this invention realizes the introductorily enumerated objectives. It will similarly be apparent that the invention also possesses the hereinbefore listed advantages and provides new, novel and useful improvements in a structure for processing a product.

Having thus described and illustrated the preferred embodiments of this invention in several variants thereof, the invention is not to be interpreted as being restricted to the specifically illustrated and described variants or embodiments as set forth in the drawings and in this specification, except insofar as is necessitated by the appended claims and the disclosures of the prior art.

The invention is hereby claimed as follows:

1. An agitator and scraper blade supporting device adapted to be mounted coaxially within an elongated and cylindrical product processing cylinder having a product inlet end and a product outlet end, comprising, an elongated and imperforate shaft means having at the product inlet portion thereof a substantially square cross section extending lengthwise thereof throughout approximately one-half of the length of said shaft means and having on that portion an outer surface comprised of four longitudinally extending straight and flat major surfaces of substantially equal width and of substantially equal length and having throughout the remaining portion of the length of said shaft means at the outlet portion thereof a pair of substantially equal length and substantially equal width and parallel and opposed major flat surfaces which extend longitudinally of said shaft and which are joined along their juxtaposed edges by two outwardly convex and opposed and uniformly curved major surfaces of equal length and of equal width and uniformly spaced from the longitudinally extending central axis of said shaft means, said curved major surfaces each having a radius equal to the radial spacing af the edges of said pair of parallel and opposed flat surfaces.

2. In combination, a cylindrical processing chamber having an inlet end and an outlet end, a coaxially mounted and imperforate surfaced rotatable agitator shaft housed centrally within said processing chamber and forming with said processing chamber a substantially annular flow passage, scraper blade means each carried on said agitator shaft outwardly of said shaft and within said processing chamber by a plurality of blade supporting device means arranged in a row adapting said blade means to scrapingly engage the inner surface of said processing chamber throughout the entire length of said scraper blade means, said shaft being hollow and having at the product inlet portion thereof a substantially square cross section extending lengthwise thereof throughout approximately one-half of the length of said shaft and having at that portion thereof an outer surface comprised of four longitudinally extending straight and flat surfaces of substantially equal width and of substantially equal length and having throughout the remaining portion of the length of said shaft at the outlet portion thereof a pair of substantially equal length and substantially equal width and parallel and opposed major flat surfaces which extend longitudinally of said shaft and which are joined along their juxtaposed edges by two outwardly convex and opposed and uniformly curved major surfaces of equal length and of equal width and uniformly spaced from the longitudinally extending central axis of said shaft, said curved major surfaces each having a radius equal to the radial spacing of the edges of said pair of parallel and opposed major flat surfaces, said major flat surfaces of said shaft adjacent the outlet portion thereof comprising equal width continuations of two opposed and equal width flat surfaces of said shaft adjacent the inlet portion thereof forming thereby two opposed and parallel flat surfaces which extend substantially the entire length of said shaft on opposite sides thereof and which underlie the rear edges of an opposed pair of said scraper blade means, said scraper blade means each being substantially flat and elongated and straight and relatively thin and narrow compared to its length and being provided with an uninterrupted and straight leading and scraping edge and an uninterrupted and straight following and uniformly rounded rear blade edge, said rounded rear blade edge comprising a supporting and product spreading and pivot edge, and a series of uniformly spaced product by-pass apertures in each said blade means intermediate said scraping edge and said supporting and product spreading edge.

References Cited in the file of this patent

UNITED STATES PATENTS

| | | |
|---|---|---|
| 1,907,486 | Boileau | May 9, 1933 |
| 2,063,065 | Vogt et al. | Dec. 8, 1936 |
| 2,211,387 | Routh | Aug. 13, 1940 |
| 2,278,340 | Weinreich et al. | Mar. 31, 1942 |
| 2,282,298 | Vogel | May 5, 1942 |
| 2,306,602 | Harrington | Dec. 29, 1942 |
| 2,425,671 | Crandall et al. | Aug. 12, 1947 |
| 2,526,367 | Kaltenbach et al. | Oct. 17, 1950 |
| 2,538,716 | Wakeman | Jan. 16, 1951 |
| 2,576,995 | Carvel | Dec. 4, 1951 |
| 2,810,557 | Phelan | Oct. 22, 1957 |